Figure 1:
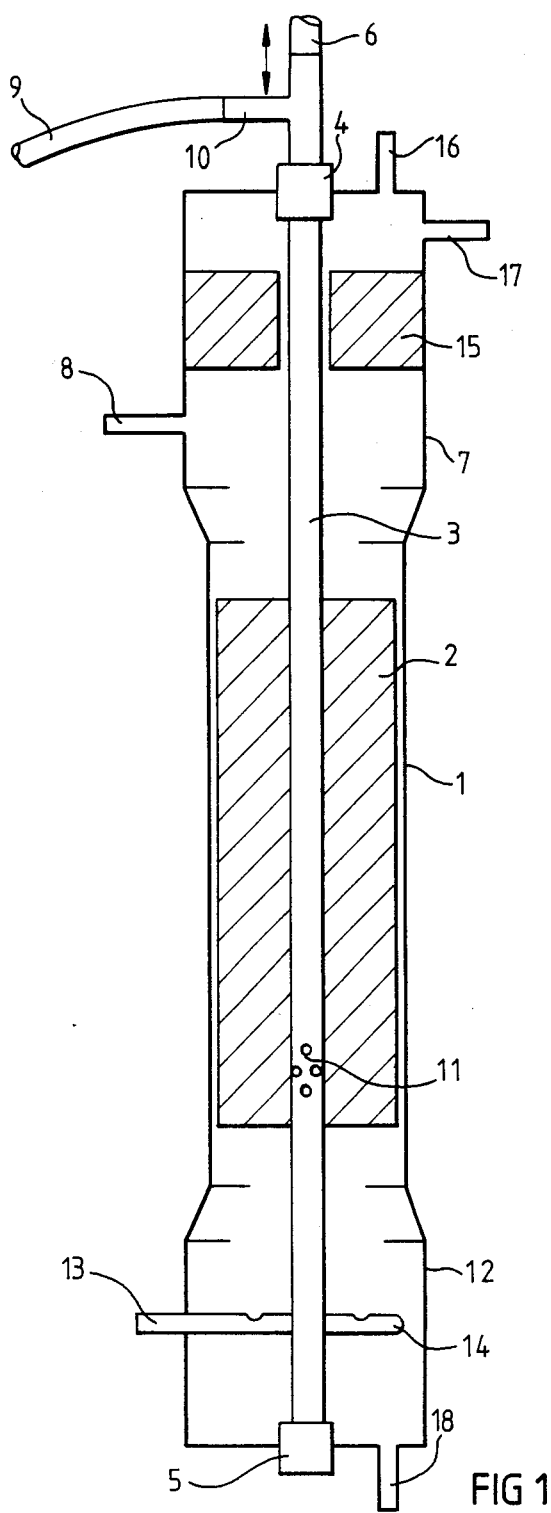

United States Patent [19]

Priestley

[11] Patent Number: 4,786,414
[45] Date of Patent: Nov. 22, 1988

[54] GAS DISPERSED PACKED EXTRACTION COLUMN

[76] Inventor: Ronald Priestley, 84 Chesterwood Road, Birmingham B13 OQE, United Kingdom

[21] Appl. No.: 66,610

[22] Filed: Jun. 26, 1987

[30] Foreign Application Priority Data

Jul. 26, 1986 [GB] United Kingdom ............... 8618275

[51] Int. Cl.⁴ ............................................. B01D 11/04
[52] U.S. Cl. .................................. 210/634; 196/14.52; 210/511; 422/257
[58] Field of Search ............................. 210/634, 511; 196/14.52; 422/256, 257, 260

[56] References Cited

U.S. PATENT DOCUMENTS 2,852,349  9/1958  Hicks et al. ................... 210/634
4,491,565  1/1985  Verachtert ..................... 422/256

FOREIGN PATENT DOCUMENTS 54-10276  1/1979  Japan ............................ 422/260
2092469  8/1982  United Kingdom ........ 422/257

Primary Examiner—Peter Hruskoci
Attorney, Agent, or Firm—Leydig, Voit & Mayer

[57] ABSTRACT

A liquid extraction process involving countercurrent flow of aqueous and organic liquid phases with gas dispersion in the organic phase is carried out in a pulsed column with for example a knitted bed, and the organic phase is discharged into the bed via a tube which physically supports the bed and is used for (optional) reciprocation of the bed to pulse the phases.

6 Claims, 1 Drawing Sheet

GAS DISPERSED PACKED EXTRACTION COLUMN

Liquid extraction processes are used for the separation of a component from a solution with a second immiscible liquid. The separation depends upon the difference in the distribution of the component to be separated between the two liquid phases.

In a conventional countercurrent packed extraction column, the less dense phase is introduced into the column below the packed section and rises through the packed section where it is brought into contact with the descending more dense phase.

It is possible to reduce the height of packed bed required for a specified degree of separation by increasing the rate of mass transfer within the packed bed. In practice, this has been achieved in pulsed columns either by reciprocating the bed or by applying a pulse to the liquid in the column. Quoting from Perry's "Chemical Engineers' Handbook" 6th Edition 21-81 (1984) "Pulsing reduces the size of dispersed phase droplets, increases hold-up and increases interfacial area for mass-transfer. There is greater tendency to emulsification and maximum throughput is decreased, but H.E.T.S. (Height Equivalent to a Theoretical Stage) is reduced considerably by the pulsing".

In Patent GB No. 2092469 the efficiency of a countercurrent extraction column is increased by dispersing gas in the organic liquid phase by means of a knitted strand packing. The preferred strand material is a composite of high and low energy surfaces such as stainless steel with polypropylene.

However it has now been discovered that as the throughput is increased, with the organic phase droplets rising into the bed from a distributor below the packed bed, the downward flow of the aqueous phase entrains a fraction of the organic phase from the bed before the gas can be dispersed completely. The consequent recirculations of the organic phase across the bottom face of the packing limits the throughput of the column.

The present invention teaches how the capacity and mass transfer rates may be increased.

According to the invention, a liquid extraction process comprises contacting organic and aqueous phase liquids, and dispersing gas in the organic phase to reduce the density of the same, the contacting being promoted by flowing the respective liquids through a stranded bed, characterized in that the organic phase is discharged into the stranded bed through a pipe or pipes extending into the bed with openings in the interior of the bed.

The combined effect of dispensing gas in the organic phase and introducing the organic phase directly into the interior of the bed completely transforms the conditions which determine the maximum throughput of the column.

When the teaching of the present invention is followed and the organic phase is introduced directly into the body of the packed bed, only those droplets which are entrained by the downward flow of the aqueous phase are present in that region of the bed between the lowest openings in the feed pipe and bottom face of the packed bed. As gas is dispersed into these entrained droplets the increased buoyancy of the frothy droplets causes them to rise up the bed before reaching the face of the bed. This probably explains the increased capacity of a static column when the feed arrangements are changed from the conventional distributor below the bed to direct injection into the body of the bed.

In accordance with an aspect of the invention the column is pulsed, by reciprocating the bed or applying a pulse action to the liquid column but maintaining the bed stationary.

The explanation given above in relation to increased capacity is only an incomplete explanation of the surprising finding that in contrast with the accepted performance of a conventional pulsed column, the maximum throughput of the pulsed column according to the invention, under certain conditions of amplitude and frequency, may appreciably exceed that of the static column. It is possible that a factor in this improved performance is an increase in the rate of gas dispersion into the organic phase of a consequence of the greater relative motion of the stranded bed and the gas-liquid mixture in the region surrounding the organic phase feed points.

In a conventional pulsed column, there is a tendency to form emulsions which are difficult to separate as the flow rates and the agitation are increased. It may have been expected that this tendency would be greater with the novel design because of the higher throughputs and the frothy nature of the organic phase. In fact, it has proved possible to operate according to the invention without the formation of an emulsion at appreciably higher throughputs and frequencies (and in consequence, higher mass transfer rates) than the throughput and frequency at which emulsions are formed in conventional pulsed equipment.

The present invention resides in the process, and also in the apparatus for carrying out the process.

FIG. 1, illustrates a diagrammatic elevation of an apparatus for carrying out the present invention.

In the drawing, a vertical cylindrical tube 1 contains the annular body which forms the "bed" and may be of knitted strands 2. The bed is supported by a tube 3 which passes through the centre of the bed and the said tube 3 is held in this position by an upper 4 and lower bearing 5. The tube extends outside the extraction column where it is attached to a reciprocating mechanism.

The aqueous phase, e.g. a water stream is fed to an enlarged cylindrical section 7 of the column via nozzle 8. The rich organic liquor is fed via a flexible tube 9 to a branch tube 10 connected to the reciprocating tube 3. This rich organic liquor is injected directly into the bed through several perforations 11 in the walls of the reciprocating tube 3. Gas is injected into the enlarged cylindrical section 12 by way of a nozzle 13 to a sparge tube 14 from where the gas rises into the bed and is dispersed spontaneously in the rich organic liquor.

The rivulets, of organic liquor containing small (i.e. ~1 mm dia.) gas bubbles flow upwards through the bed at a velocity enhanced by the presence of the dispersed gas. The organic raffinate from the top of the bed flows upwards into the enlarged section (7).

At the top of the column is a stationary pad of knitted stainless steel and polypropylene strands (15) where the rising organic raffinate coalesces and the disperse gas bubbles rise to the surface and leave the column through a nozzle (16). The organic raffinate overflows through the nozzle 17. The rich aqueous liquor extract is withdrawn from a nozzle 18 at the column base.

One experiment involved a static column. This has a 7.6 cm diameter column with a 2 cm diameter central tube supporting a 60 cm high bed of knitted stainless steel and polypropylene strands. Kerosene was injected via 20×1 mm diameter holes arranged around the central tube and a minimum of 2.5 cm above the bottom of the bed. Air that was introduced to the column via a sparge tube below the bed was spontaneously dispersed in the kerosene/benzoic acid solution and flowed upwards as frothy rivulets countercurrently to the downward flow of water.

With equal flow rates of kerosene, air and water, the column operated without flooding up to a flow rate of 4 liters per minute of each phase or a combined kerosene and water flow rate of 8 liters per minute.

For comparison, the column referred to in the previous paragraph was then re-arranged to operate in the manner described in said prior U.S. Pat. No. 2,092,469. In other words, instead of introducing the kerosene via the central tube, the kerosene was introduced through a sparge pipe located below the knitted bed. In this case, the column was found to flood and become inoperable at a combined kerosene and water flow rate of 5.5 liters per minute.

A further experiment utilised an identical column to that described above, with the kerosene feed via the central tube supporting the fibrous bed and the bed was reciprocated at an amplitude of 1 cm and a frequency of 340 cycles per minute. In this case, with equal flow rates of kerosene, water and air, the combined kerosene and water flow rate reached 10 liters per minute before flooding occurred.

In both experiments utilising the invention, the rising organic liquor was observed to contain frothy rivulets of small gas bubbles, estimated to be of the order of 1 mm diameter. The dispersed gas enhanced the velocity of the upward flow.

The significance of the combined effect of the air dispersion and the submerged feed was also demonstrated by operating the column with a benzoic acid solution in kerosene and water feed rates each of 2 liters/minute and an amplitude of 1 cm. Without air dispersion, an emulsion was formed with the bed reciprocating at a frequency of 350 min $^{-1}$ when the "Height of a Theoretical Stage" was 95 cm. With air dispersion, it was possible to increase the frequency of reciprocation to 500 min $^{-1}$ when the increase in mass transfer rate reduced the "Height of a Theoretical Stage" to 50 cm. It was also possible to increase the feed rate of each of the three phases to 3 liters/minute at the higher frequency without the formation of emulsion.

I claim:

1. A liquid extraction process comprising contacting organic and aqueous phase liquids to separate components from said aqueous phase liquid into said organic phase liquid, and dispersing gas in the organic phase to reduce the density of the same, the contacting being promoted by flowing the respective liquids through a stranded bed, said bed supported in position in a column by a pipe connected to the organic phase supply used in said contacting, said pipe having openings in the interior of the bed to deliver the supply to said contacting, wherein the openings of the pipe are set at least as far above the bottom of the bed as the cross-sectional dimension of said pipe, wherein the pipe extends through bearing seals in the column above and below the bed; delivering the gas through a sparge pipe below said bed, and, removing the organic phase containing said components, and the aqueous phase from the column.

2. A process as claimed in claim 1 wherein the bed is of stainless steel and polypropylene strands.

3. A process as claimed in claim 2 wherein the strands are knitted.

4. A process as claimed in any of claim 1 wherein the bed is pulsed.

5. A process as claimed in claim 4 wherein said pipe is reciprocated to provide the pulsing.

6. A process as claimed in claim 1 wherein the column is pulsed.

* * * * *